F. A. ROSS.
ANTIVIBRATION SUSPENSION DEVICE.
APPLICATION FILED FEB. 5, 1919.
1,302,482.  Patented Apr. 29, 1919.
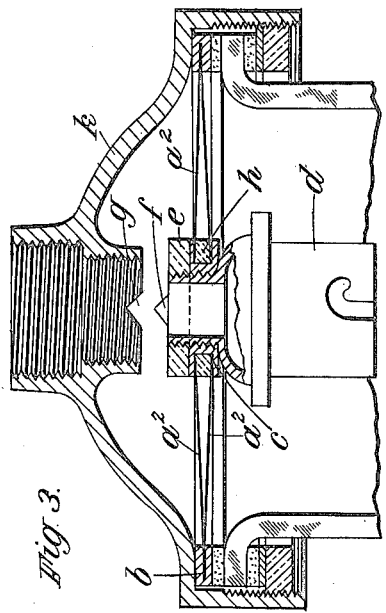
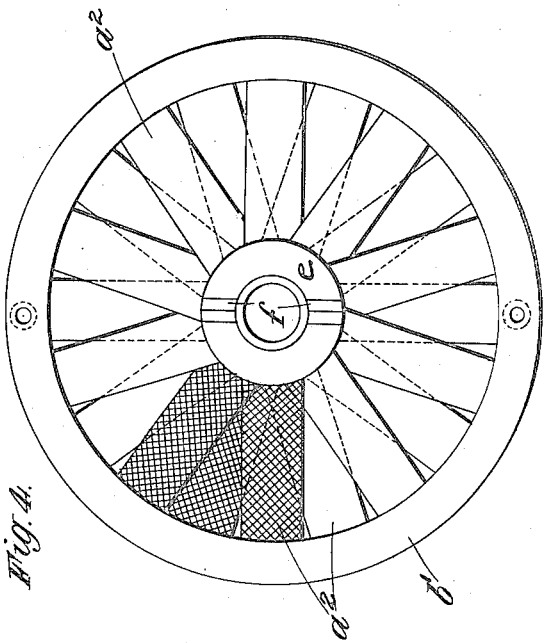
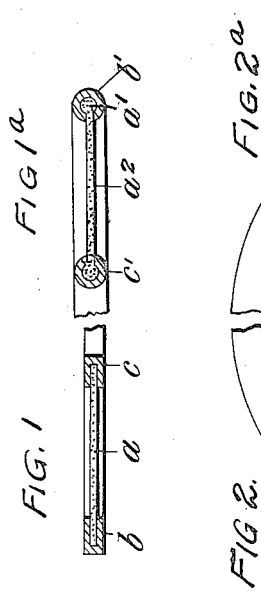
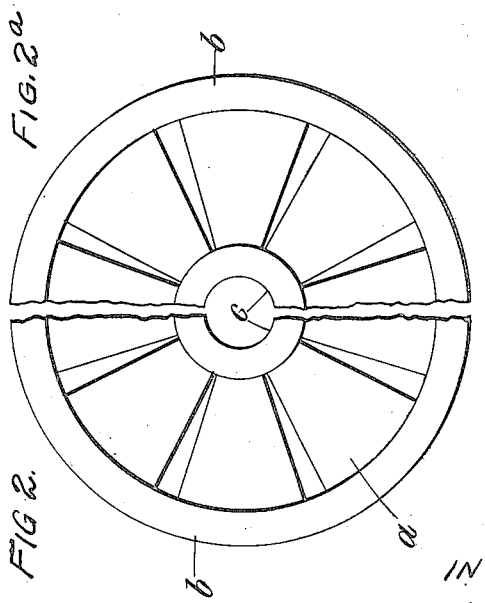
INVENTOR
FREDERICK A ROSS

UNITED STATES PATENT OFFICE.

FREDERICK ALEXANDER ROSS, OF WHITLEY BAY, ENGLAND.

ANTIVIBRATION SUSPENSION DEVICE.

1,302,482. Specification of Letters Patent. Patented Apr. 29, 1919.

Application filed February 5, 1919. Serial No. 275,269.

*To all whom it may concern:*

Be it known that I, FREDERICK ALEXANDER ROSS, a subject of the King of Great Britain and Ireland, and a resident of Whitley Bay, county of Northumberland, England, have invented a certain new and useful Improvement in Antivibration Suspension Devices, of which the following is a specification.

This invention relates to anti-vibration devices suitable for protecting delicate instruments and the like from vibration, and consists of outer and inner frames, rings or fittings to which is attached a suitable flexible material, so that if the instrument to be protected from vibration or shock is attached to the inner frame, all vibration imparted to the outer frame or fitting will be dissipated or absorbed in passing through the flexible material, before it reaches the suspended object. The flexible or absorbing material consists of wire gauze or other woven or braided or elastic material, cut into segments or strips and fitted between outer and inner frames, rings or fittings. If a woven material is used the best results are obtained by cutting the gauze into segments or strips so that when fitted between the outer and inner frames, the diagonal of the mesh runs from the inner to the outer frame, the object being to avoid connecting any single strand of the gauze or woven material through which vibration could be transmitted from the outer frame to the suspended object. I will now proceed to describe the invention more in detail.

Figure 1 is a fragmentary cross section of one form of my anti-vibration suspension device.

Fig. 1ª is a fragmentary cross section of a modified form thereof.

Fig. 2 is a top plan view of the structure shown in Fig. 1.

Fig. 2ª is a top plan view of the structure shown in Fig. 1ª.

Fig. 3 is a vertical cross sectional view of an electric socket supporting structure showing in cross section another form of my improved anti-vibration suspension device.

Fig. 4 is a top plan view of the suspension device shown in Fig. 3.

Similar reference characters designate corresponding parts throughout the several figures of the drawing.

Referring to the drawings it will be observed that Fig. 1 shows inner and outer frame members $b$ and $c$ connected by an intermediate web of anti-vibration transmitting material. The material may be made in the strip or segment form as indicated at $a$ in Figs. 2 and 2ª and is preferably of rubber or other flexible material which will constitute a shock absorbing medium. According to the arrangement shown in Figs. 1 and 2 it is proposed to secure the opposite ends of the shock absorbing material $a$ in the annular recesses of the frame members or rings $b$ and $c$, while according to Figs. 1ª and 2ª the ends $a'$ of the shock absorbing strips $a$ may be enlarged or beaded as shown.

Referring to Figs. 3 and 4 it will be observed that it is proposed to effect the suspension of the article by the inner frame $c'$ which is connected to the outer frame $b'$ by strips of wire gauze $a^2$ or other woven or braided material, the said outer frame $b'$ being arranged in a fitting $k$, suitable for carrying an electric lamp, to prevent the filament of the lamp being broken by vibration or shock to which the outer fitting may be subjected, as, for instance, on board ship, and under gun-fire. In connection with the shock absorbing strips $a^2$ shown in this form of the invention, it is to be observed that the wire gauze or other woven material employed for this purpose is cut so that the individual strands thereof are disposed diagonally from the inner ring toward the outer ring to produce a diagonal mesh formation, whereby the individual strands of the woven material will not be parallel to the radius of the circular supporting frame. By this bias cutting of the fabric a plurality of obliquely disposed strands are provided which effectually prevent the transmission of direct vibrations from the outer ring $b'$ to the inner ring $c'$. The lampholder $d$ is attached to the center ring by a nut $e$ having spigots $f$ which engage with recesses or holes in the fitting $k$, so that when a lamp is being inserted or withdrawn the lampholder will be rigidly held and no strain will be put upon the suspension element.

The lampholder is wired by a flexible insulated wire from a suitable terminal attached to the fitting $k$. The normal position of the lampholder is shown in Fig. 3 and the spigots $f$ only engage with holes $g$ when the lampholder is pushed upward, this action being necessary to overcome the pressure of the lampholder plunger springs when inserting or withdrawing a lamp. If desired, the gauze may be fitted to both sides of the frame, as shown in Figs. 3 and 4, separated at the center by ring $h$, or it may be fitted to one side only and two or more units used together, or separately in order to prevent swinging of the instrument or lamp.

The best results are obtained by using woven material for the following reasons:— The mesh effectively damps all vibration. The material can be made strong enough to prevent distortion or side swinging of the lamp or instrument due to shock. The material allows heat to be dissipated and is not readily destroyed by atmospheric conditions.

Having now described my invention, what I claim as new and desire to secure by Letters Patent of the United States is:—

1. An anti-vibration support consisting of an outer frame member, an inner article supporting frame of channel formation, a plurality of woven shock absorbing strips all having their outer ends anchored in the same plane in the outer frame, and a ring for coöperating with the channeled inner article supporting frame for securing the inner ends of alternate strips in spaced planes whereby adjacent strips are disposed in planes diverging toward the inner frame.

2. An anti-vibration support consisting of an inner article suspending frame, an outer supporting frame, and strips of woven material connecting said inner and outer frames, said strips being cut on the bias whereby the warp and weft strands thereof are disposed obliquely with reference to a line intersecting the center and periphery of the combined structure.

In testimony whereof I have affixed my signature this tenth day of January 1919.

FREDERICK ALEXANDER ROSS.